Nov. 20, 1923.  
R. I. MAUJER  
1,474,976  
SYSTEM OF CONTROL FOR SYNCHRONOUS MOTORS DRIVING THROUGH CLUTCHES  
Filed July 8, 1922
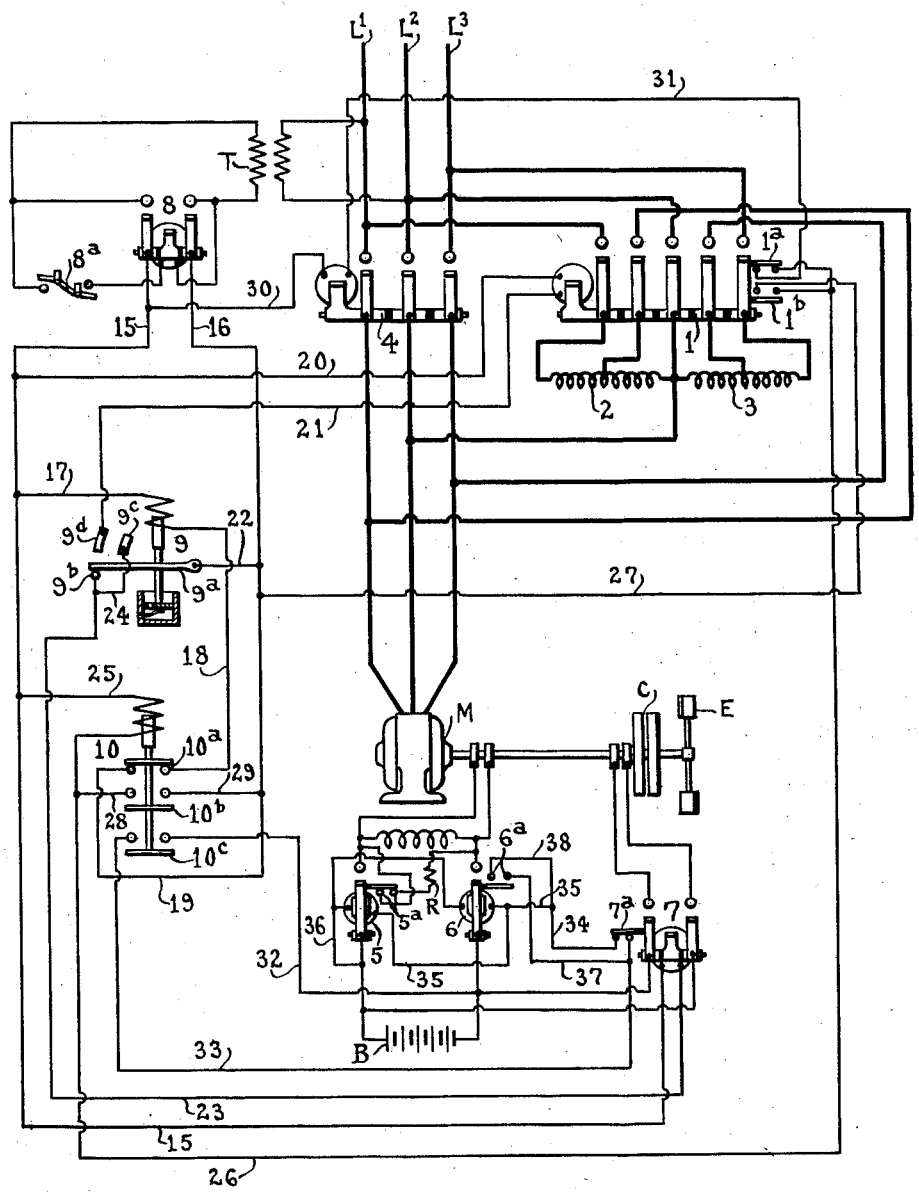
INVENTOR.  
Robert I. Maujer  
BY Franklin Hubbard  
ATTORNEY.

Patented Nov. 20, 1923.

1,474,976

UNITED STATES PATENT OFFICE.

ROBERT I. MAUJER, OF CINCINNATI, OHIO, ASSIGNOR TO THE CUTLER-HAMMER MFG. CO., OF MILWAUKEE, WISCONSIN, A CORPORATION OF WISCONSIN.

SYSTEM OF CONTROL FOR SYNCHRONOUS MOTORS DRIVING THROUGH CLUTCHES.

Application filed July 8, 1922. Serial No. 573,664.

*To all whom it may concern:*

Be it known that I, ROBERT I. MAUJER, a citizen of the United States, residing at Cincinnati, in the county of Hamilton and State of Ohio, have invented new and useful Improvements in Systems of Control for Synchronous Motors Driving Through Clutches, of which the following is a full, clear, concise, and exact description, reference being had to the accompanying drawing, forming a part of this specification.

This invention relates to systems of control for synchronous motors driving through clutches or other releasable connections.

Synchronous motors may be designed for a relatively high starting torque but the same will not pull into step if loaded. For this reason it has heretofore been the usual practice to first synchronize the motor and then accelerate its load through the medium of a friction clutch. It is necessary to effect gradual acceleration of the load and in practice it has been found that the slippage between the clutch surface tends to produce rapid deterioration thereof. It has also been found that the clutch must be of relatively large capacity in proportion to the load in order to start the same in this manner.

The present invention has among its objects to provide a control system for synchronous motor drives wherein provision is made for connecting a load of high inertia to the motor during starting of the latter and for temporarily disconnecting the load from the motor to permit the latter to pull into step.

Another object is to provide an automatic controller adapted to automatically establish starting and running connections for the synchronous motor and to also effect automatic control of the clutch in the manner aforestated.

Various other objects and advantages of the invention will hereinafter appear.

The accompanying drawing diagrammatically illustrates an embodiment of the invention which will now be described, it being understood that the embodiment illustrated is susceptible of modification without departing from the scope of the appended claims.

In the drawing, M indicates a synchronous motor having a stator provided with the usual armature windings to be supplied with current from a three phase supply circuit indicated by lines $L'$, $L^2$ and $L^3$ and a rotor having the usual field windings to be supplied with current from a suitable source such as a battery B. Motor M is adapted to be connected to a high inertia load such as a fan E through the medium of a clutch C, said clutch being of a conventional magnetic type.

The controller includes a 5-pole electromagnetic switch 1 adapted to establish starting connections for the motor through compensator windings 2 and 3, a 3-pole electromagnetic switch 4 for establishing running connections therefor, and two single pole electro-magnetic switches 5 and 6 for connecting the field of the motor to battery B, the former switch having contacts $5^a$ associated therewith for normally including a field resistance R. The controller also includes a 2-pole electro-magnetic switch 7 for establishing an energizing circuit for clutch C from battery B.

The control means for the aforedescribed switches includes a double pole electro-magnetic switch 8 and electro-magnetic relays 9 and 10. Switch 8 is controlled by a snap switch $8^a$ and as hereinafter set forth said switch supplies current from a transformer T for energization of the operating windings of starting switch 1, running switch 4, clutch control switch 7 and relays 9 and 10. Relay 9 is of the dash pot retarded type, the dash pot thereof being arranged to permit quick upward movement of movable contact member $9^a$ and to retard downward movement of said member. Contact member $9^a$ normally engages a contact $9^b$ connected in the energizing circuit of clutch control switch 7 and upon movement thereof out of normal position the same engages contacts $9^c$ and $9^d$, the contact $9^c$ being connected in the energizing circuit of said clutch control switch and the contact $9^d$ being connected in the energizing circuit of starting switch 1. Relay 10 is provided with normally closed contacts $10^a$ and normally open contacts $10^b$ and $10^c$. Contacts $10^a$ control the energizing circuit of relay 9 and contacts $10^b$ serve to establish a maintaining circuit for the operating winding of relay 10 and also serve to establish an energizing circuit for running switch 4 through the medium of normally closed auxiliary contacts $1^a$ associated with starting switch 1. Contacts 10ᶜ control the energizing circuits of field switches 5 and 6 through the medium of an auxiliary switch 7ᵃ associated with switch 7 and field control switch 6 is provided with auxiliary contacts 6ᵃ for maintaining itself and switch 5 through contacts 10ᶜ.

The operation and circuit connections of the aforedescribed controller will now be more fully set forth. Closure of switch 8ᵃ establishes an energizing circuit for switch 8 extending from the upper terminal of the secondary winding of transformer T through said switch, through the winding of switch 8 to the lower terminal of said secondary winding, and upon closure of switch 8 the upper terminal of said secondary winding is connected to conductor 15 and the lower terminal thereof is connected to conductor 16. Immediately upon closure of switch 8 relay 9 is energized by a circuit extending from conductors 15 to 17 through the operating winding of said relay by conductor 18 through the normally closed contacts 10ᵃ of relay 10 and by conductor 19 to conductor 16. Relay 9 thereupon responds to establish an energizing circuit for starting switch 1 extending from conductor 15 by conductor 20 through the operating winding of starting switch 1 by conductor 21 to contact 9ᵈ through movable contact member 9ᵃ and by conductor 22 to line 16. Response of relay 9 also establishes an energizing circuit for the clutch control switch 7 extending from conductor 15 through the winding of said switch by conductors 23 and 24 to contact 9ᶜ and through the movable contact member 9ᵃ and conductor 22 to conductor 16. Closure of switch 7 connects the winding of the clutch C across the terminals of battery B such connections being obvious from the drawing and switch 1 in responding establishes well known reduced voltage connections to the armature of motor M from lines L′, L² and L³ through compensator windings 2 and 3. Motor M then starts up as an induction motor, the field circuit thereof being connected in a closed loop through discharge resistance R by auxiliary switch 5ᵃ of field switch 5 and during starting thereof load E is accelerated through the medium of clutch C.

Immediately upon closure of starting switch 1, the auxiliary contacts 1ᵇ thereof establish an energizing circuit for relay 10 extending from conductor 15 by conductor 25 through the winding of said relay by conductor 26 through auxiliary contacts 1ᵇ and by conductor 27 to conductor 16. In responding relay 10 interrupts the energizing circuit for timing relay 9, extending through the contacts 10ᵃ thereof and establishes a maintaining circuit for its winding extending from conductors 15 and 25 through said winding as by conductor 28 through contacts 10ᵇ and by conductor 29 to conductor 16. Upon de-energization of relay 9 the movable contact element thereof disengages contacts 9ᶜ and 9ᵈ to de-energize starting switch 1 and clutch control switch 7 and upon opening of starting switch 1, running switch 4 is energized by circuit extending from conductor 15 by conductor 30 through the operating winding of said running switch by conductor 31 through auxiliary switch 1ᵃ by conductors 26 and 28 through contacts 10ᵇ and by conductor 29 to conductor 16. Switch 4 in closing establishes running connections for the motor which are apparent from the drawing, and immediately upon opening of clutch control switch 7 field switches 5 and 6 are energized by a circuit extending from the right hand terminal of battery B by conductor 32 through contacts 10ᶜ by conductor 33 through contacts 7ᵃ of switch 7 by conductors 34 and 35 through the operating windings of switches 5 and 6 in parallel and by conductor 36 to the left hand terminal of the battery B. Thus provision is made for establishing running connections for the motor and for simultaneously de-energizing clutch C upon establishment of such connections to unload the motor and permit the same to pull into step. Relay 9 is calibrated so that the same does not return to normal position until the motor pulls into step and upon return of the contact member 9ᵃ to normal position the aforedescribed energizing circuit for clutch control switch 7 is re-established through contact 9ᵇ and upon closure of said switch clutch C is again energized to bring load E up to synchronous speed. Upon response of switch 7, field control switch 6 maintains itself and also field control switch 5 in closed position through a circuit extending from the right hand terminal of battery B to conductor 33 as already traced by conductor 37 through auxiliary switch 6ᵃ of switch 6 by conductors 38 and 35 through the windings of said field switches in parallel and by conductor 36 to the left hand terminal of battery B.

Opening of push button switch 8ᵃ de-energizes switch 8 and said switch in opening de-energizes relay 10 to interrupt the aforedescribed energizing circuits of running switch 4, field control switches 5 and 6 and the clutch of control switch 7. The motor thereupon comes to rest, the current in the field being discharged through resistance R and switch 5ᵃ of field switch 5.

What I claim as new and desire to secure by Letters Patent is:

1. The combination with a synchronous motor, and a releasable driving connection therefor, of means for starting said motor and means for establishing said driving connection during starting of said motor and for temporarily releasing the same as the speed of said motor approaches synchronism to permit said motor to came into step.

2. The combination with a synchronous motor, of an electromagnetic clutch for establishing driving connections therefor, means for establishing starting and running connections for said motor and control means for said clutch adapted to effect engagement thereof upon establishment of starting connections and to effect disengagement thereof for a temporary period upon establishment of running connections to permit said motor to come into step.

3. The combination with a synchronous motor and an electro-magnetic clutch for establishing driving connections therefor, switches for establishing starting and running connections for said motor, control means for said switches insuring establishment of starting connections prior to establishment of running connections and establishment of running connections upon interruption of starting connections and means associated with said former means for effecting engagement of said clutch upon establishment of starting connections and disengagement thereof for a temporary period upon establishment of running connections.

4. The combination with a synchronous motor and an electro-magnetic clutch for establishing driving connections therefor, electro-responsive switches for establishing starting and running connections for said motor control means for said switches including a timing relay adapted to insure establishment of starting connections prior to establishment of running connections and establishment of running connections upon interruption of starting connections and control means for said clutch associated with said timing relay to effect engagement of said clutch upon establishment of starting connections and disengagement of said clutch for a temporary period upon establishment of running connections.

5. The combination with a synchronous motor and an electro-magnetic clutch for establishing driving connections therefor, of electro-responsive switches for establishing starting and running connections for said motor, control means for said switches including a timing relay responsive to establish starting connections and adapted when de-energize to interrupt said starting connections and establish running connections, and control means for said clutch associated with said relay to effect engagement of said clutch upon response of said relay and disengagement of said clutch for a temporary period during return of said relay to normal position.

In witness whereof, I have hereunto subscribed my name.

ROBERT I. MAUJER.